E. C. BENNETT & C. J. HILLARD.
CRANK PIN CONNECTION.
APPLICATION FILED APR. 29, 1911.
1,048,485.
Patented Dec. 31, 1912.
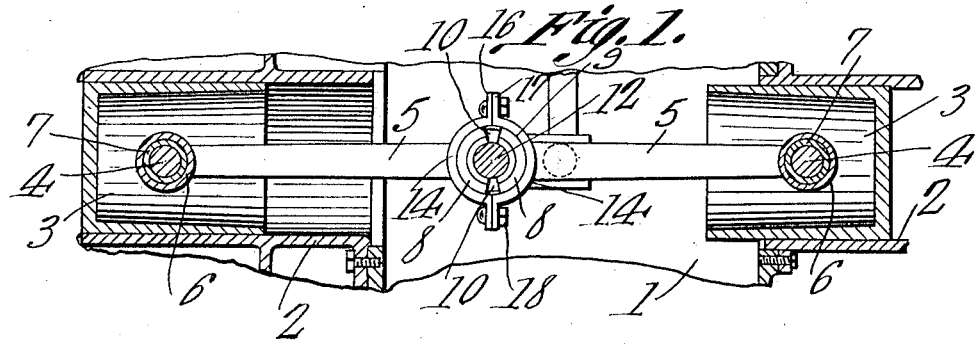
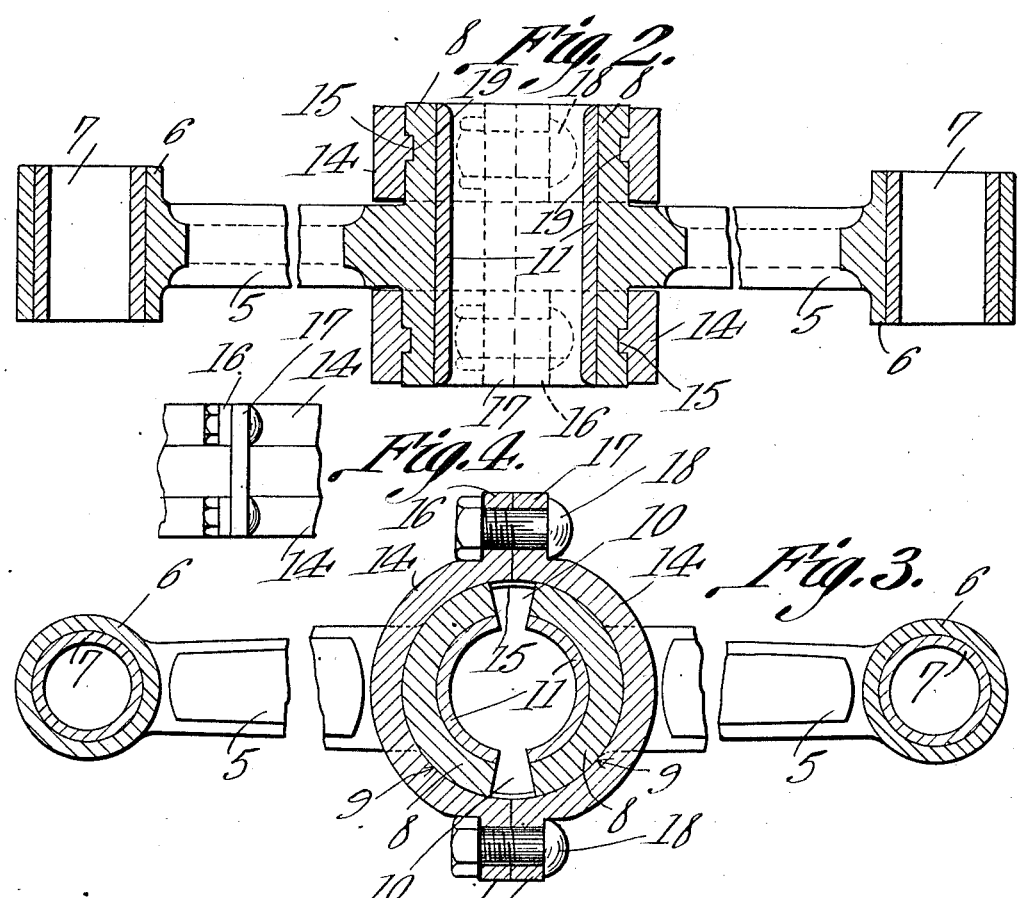

UNITED STATES PATENT OFFICE.

EDWARD C. BENNETT, OF WORMLEYSBURG, AND CHARLES J. HILLARD, OF HARRISBURG, PENNSYLVANIA.

CRANK-PIN CONNECTION.

1,048,485.  Specification of Letters Patent.  Patented Dec. 31, 1912.

Application filed April 29, 1911. Serial No. 624,225.

*To all whom it may concern:*

Be it known that we, EDWARD C. BENNETT and CHARLES J. HILLARD, citizens of the United States, residing, respectively, at Wormleysburg and Harrisburg, in the counties of Cumberland and Dauphin, State of Pennsylvania, have invented a new and useful Crank-Pin Connection, of which the following is a specification.

The device forming the subject matter of this application, is a crank pin connection, adapted primarily, although not exclusively, for use upon internal combustion engines of the opposed cylinder type.

It is the object of the present invention to provide novel means whereby the ends of a pair of opposed piston rods may be operatively connected with the crank pin or other corresponding element, the construction being such that proper relative movement will be permitted, without sacrificing the strength of the structure, the device being capable of being readily taken down, to permit the renewal of crank pin bearings.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings—Figure 1 shows the invention in vertical longitudinal section; Fig. 2 is a horizontal longitudinal section upon an enlarged scale; Fig. 3 is a vertical longitudinal section upon an enlarged scale; and Fig. 4 is a fragmental top plan of the segmental elements whereby the heads of the piston rods are united about the crank pin.

The device forming the subject matter of this application, is capable of a wide variety of uses. In order, however, to show one manner in which the structure may be employed, there is depicted in Fig. 1, a portion of the frame of an internal combustion engine, this portion of the frame being designated by the reference character 1, the frame 1 carrying opposed cylinders 2, the numeral 3 designating the piston heads. The piston heads are open ended structures, provided with the usual transverse bearing pins 4.

The piston rods are denoted by the numeral 5, these rods 5 being equipped, at their remote ends, with heads 6, adapted to inclose the bearing pins 4, the heads 6 being bushed, as shown at 7. Adjacent their meeting ends, the piston rods 5 are equipped with heads 8, outstanding from the rods 5 in opposite directions, the outer surfaces of the heads 8 being of circular contour, as denoted by the numeral 9. The end faces of the heads 8 are cut away, as shown at 10 to provide for the proper relative movement between the rods 5. These end faces of the rods 5, preferably, although not necessarily, are disposed in planes which are radial with respect to the curvilinear faces 9 of the heads 8. Located within the heads 8, are bushings 11, the end faces of the bushings 11 being cut away to correspond with the end faces of the heads 8. It is within these bushings 11 that the crank pin 12 is received.

In order to hold the heads 8 about the crank pin 12, the heads are surrounded by segmental rings 14. The members 14 are connected at one end by an outstanding flange 17, the other ends of the rings 14 being bent outwardly to form ears 16. The ears 16 of one of these inclosing members, abut against the flange 17 of the other inclosing member, as Fig. 4 will serve to illustrate. Through the ears 16, and through the flange 17, bolts 18, or other securing elements adapted to a like end are passed.

If desired, in order to prevent lateral movement of the members 14 upon the heads 8, the said members 14 may be provided upon their inner faces, with outstanding ribs 15 adapted to register in circumferential grooves 19 in the outer faces of the heads 8.

From the foregoing it will be seen that a crank pin connection has been provided which will give unusual strength at the crank pin, the device being simple in construction and of few parts, accidental displacement of these parts being a matter extremely unlikely to occur; the construction, however, being such that, at the will of the operator, the crank pin connection may readily be taken down, for repairs and the like.

Having thus described the invention, what is claimed is:

In a device of the class described, opposed piston rods having segmental heads, the longitudinal edges of the heads being spaced apart, to permit relative movement between the heads; and a connection surrounding the heads, the connection comprising a pair of complemental members, each member comprising parallel segmental parts provided at one end with radially disposed ears, there being a radial flange connecting the other ends of the segmental parts, the ears of one member being disposed adjacent the flange of the other member; and means for securing the ears to the flanges; the ears and the flanges being disposed opposite to the space between the heads, and the spaces between the ears serving to give access to the spaces between the heads.

In testimony that we claim the foregoing as our own, we have hereto affixed our signatures in the presence of two witnesses.

EDWARD C. BENNETT.
CHARLES J. HILLARD.

Witnesses:
SARA L. SWENGEL,
A. W. SWENGEL.

---

Copies of this patent may be obtained for five cents each, by addressing the "Commissioner of Patents, Washington, D. C."